R. Blake,
Hand Saw.
No. 24,903.  Patented July 26, 1859.
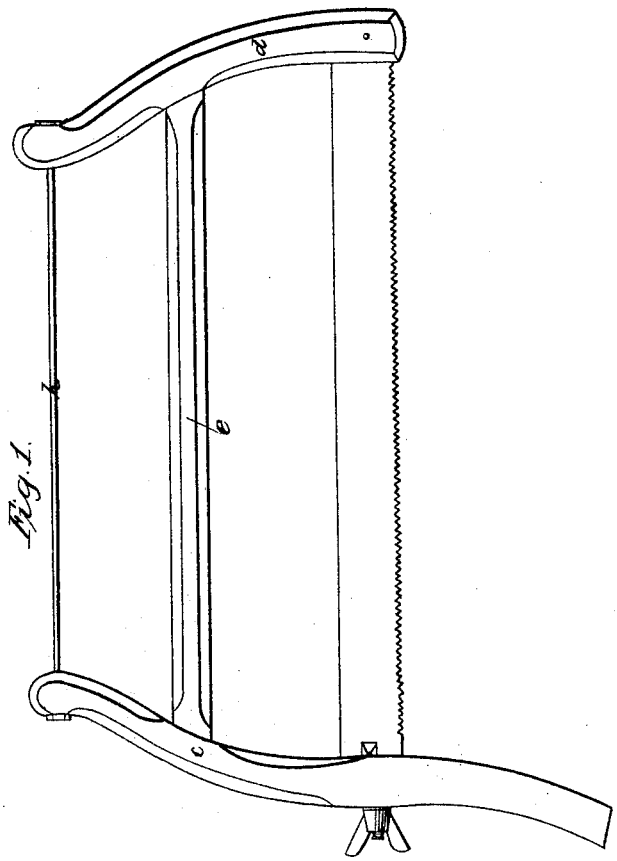
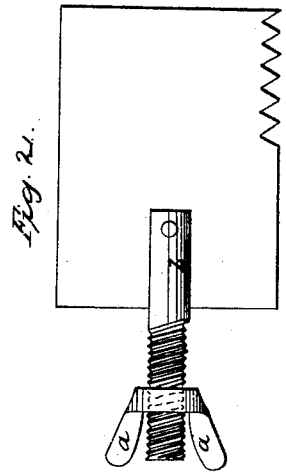
Witnesses:
J. B. Sturtevant
J. J. Hoyt
Inventor:
Eliza Blake
Executrix of Rob't Blake dec'd

UNITED STATES PATENT OFFICE.

ELIZA BLAKE, OF ALBANY, NEW YORK, EXECUTRIX OF ROBERT BLAKE, DECEASED, ASSIGNOR TO BLAKE AND SON, OF SAME PLACE.

WOOD-SAW.

Specification of Letters Patent No. 24,903, dated July 26, 1859.

*To all whom it may concern:*

Be it known that ROBERT BLAKE, deceased, did invent an Improvement in the Manufacture of Wood-Saws, and that the following is a full, clear, and exact description of the principle or character which distinguishes it from all other things before known, and of the usual manner of making, modifying, and using the same.

The invention of ROBERT BLAKE consists in a new and improved manufacture of wood saws, as herein set forth.

The wood saw is a specific article of manufacture and no definition of its peculiarities or characteristics which distinguish it from other kinds of saws need be here given, the drawings fully exhibiting the general character of the article.

The parts of this saw are not intended to be claimed, nor is it intended to claim anything more than making wood saws in the manner set forth, as a new article of manufacture.

The saw blade is strained by means of a screw and nut $a$, $b$ after a well known mode of straining saw blades; the ends of the frame $c$, $d$ are of wood and made in the usual manner, the middle brace $e$ is of wood as usual but instead of being provided at its ends with a rocking tenon, as is usual in common wood saws, the tenon is square-shouldered, so as not to rock or allow the frame to rock when the whole is properly braced. The upper brace $h$, is a rod of metal secured at the ends by nuts or heads $m$ $m$, and the whole when properly set up, makes a stiffer and lighter and more convenient wood saw than any other before known and is claimed to be a new article of manufacture or a new and useful improvement of the manufacture of wood saws.

I am aware that saws for various purposes, have been strained by a screw and nut on one end of the blade and that saws have been strained and supported in frames by cross bars and rods of metal and I therefore lay no claim to these devices, but

I claim—

The new manufacture of wood saws in the manner herein set forth, meaning by this to claim only the sole right to manufacture according to the mode of construction herein set forth the special kind and character of saws known as wood saws and clearly defined and represented in the above description and drawings.

ELIZA BLAKE,
*Executrix of Robert Blake, Deceased.*

Witnesses:
J. B. STURTEVANT,
J. J. HOYT.